United States Patent
Jang

(10) Patent No.: US 11,356,399 B2
(45) Date of Patent: Jun. 7, 2022

(54) USER CONTEXT RECOGNITION IN MESSAGING SERVICE ENVIRONMENT AND INTERACTION WITH MESSAGING SERVICE BASED ON USER CONTEXT RECOGNITION

(71) Applicant: LINE Plus Corporation, Seongnam-si (KR)

(72) Inventor: Hyukjae Jang, Seongnam-si (KR)

(73) Assignee: LINE PLUS CORPORATION, Gyeonggi-do (KR)

( * ) Notice: Subject to any disclaimer, the term of this patent is extended or adjusted under 35 U.S.C. 154(b) by 0 days.

(21) Appl. No.: 16/924,906

(22) Filed: Jul. 9, 2020

(65) Prior Publication Data

US 2020/0344195 A1 Oct. 29, 2020

Related U.S. Application Data

(63) Continuation of application No. PCT/KR2018/000628, filed on Jan. 12, 2018.

(30) Foreign Application Priority Data

May 19, 2020 (KR) .................. 10-2020-7014342

(51) Int. Cl.
*H04L 51/42* (2022.01)
*G06F 3/0484* (2022.01)
*H04M 1/72454* (2021.01)

(52) U.S. Cl.
CPC ........ *H04L 51/22* (2013.01); *H04M 1/72454* (2021.01); *G06F 3/0484* (2013.01)

(58) Field of Classification Search
CPC ............................. H04L 51/22; G06F 3/0484
See application file for complete search history.

(56) References Cited

U.S. PATENT DOCUMENTS 9,450,897 B2 * 9/2016 Chawla ................... H04L 51/04
2012/0059780 A1 3/2012 Kononen et al.
(Continued)

FOREIGN PATENT DOCUMENTS

JP      2017-174018 A     9/2017
KR  10-2007-0061118 A     6/2007
(Continued)

OTHER PUBLICATIONS

Korean Office Action dated Jun. 15, 2021 issued in corresponding Korean Patent Application No. 10-2020-7014342.
(Continued)

*Primary Examiner* — Nhat Huy T Nguyen
(74) *Attorney, Agent, or Firm* — Harness, Dickey & Pierce, P.L.C.

(57) ABSTRACT

Disclosed is technique for a user context detection and interaction with a messaging service based on a user context in a messaging service environment. An interaction method of a mobile device may include acquiring information associated with a context of at least one of a mobile device and a user of the mobile device under control of an application installed and executed on the mobile device in association with a messaging service, determining a context of the user based on the acquired information, verifying a function to be provided to the user through the messaging service based on the determined context of the user, dynamically determining a configuration of a user interface based on the determined context of the user, and providing the function through the user interface of which the configuration is dynamically determined.

8 Claims, 12 Drawing Sheets

(56) References Cited

U.S. PATENT DOCUMENTS

| | | | |
|---|---|---|---|
| 2012/0109862 A1 | 5/2012 | Kwon et al. | |
| 2013/0328665 A1 | 12/2013 | Cranfill et al. | |
| 2014/0052681 A1* | 2/2014 | Nitz | H04L 51/02 706/46 |
| 2014/0201675 A1 | 7/2014 | Joo et al. | |
| 2016/0021249 A1 | 1/2016 | Govande et al. | |

FOREIGN PATENT DOCUMENTS

| | | |
|---|---|---|
| KR | 10-2010-0095205 A | 8/2010 |
| KR | 10-2012-0018337 A | 3/2012 |
| KR | 10-1215066 B1 | 12/2012 |
| KR | 10-2013-0136575 A | 12/2013 |
| KR | 10-2014-0019500 A | 2/2014 |
| KR | 10-2016-0133154 A | 11/2016 |

OTHER PUBLICATIONS

International Search Report dated Oct. 2, 2018 issued in PCT International Application No. PCT/KR2018/000628.
Japanese Office Action dated Mar. 1, 2022 issued in corresponding Japanese Patent Application No. 2020-538609.
Korean Office Action dated Mar. 8, 2022 issued in Korean Patent Application No. 10-2022-7004807.

* cited by examiner

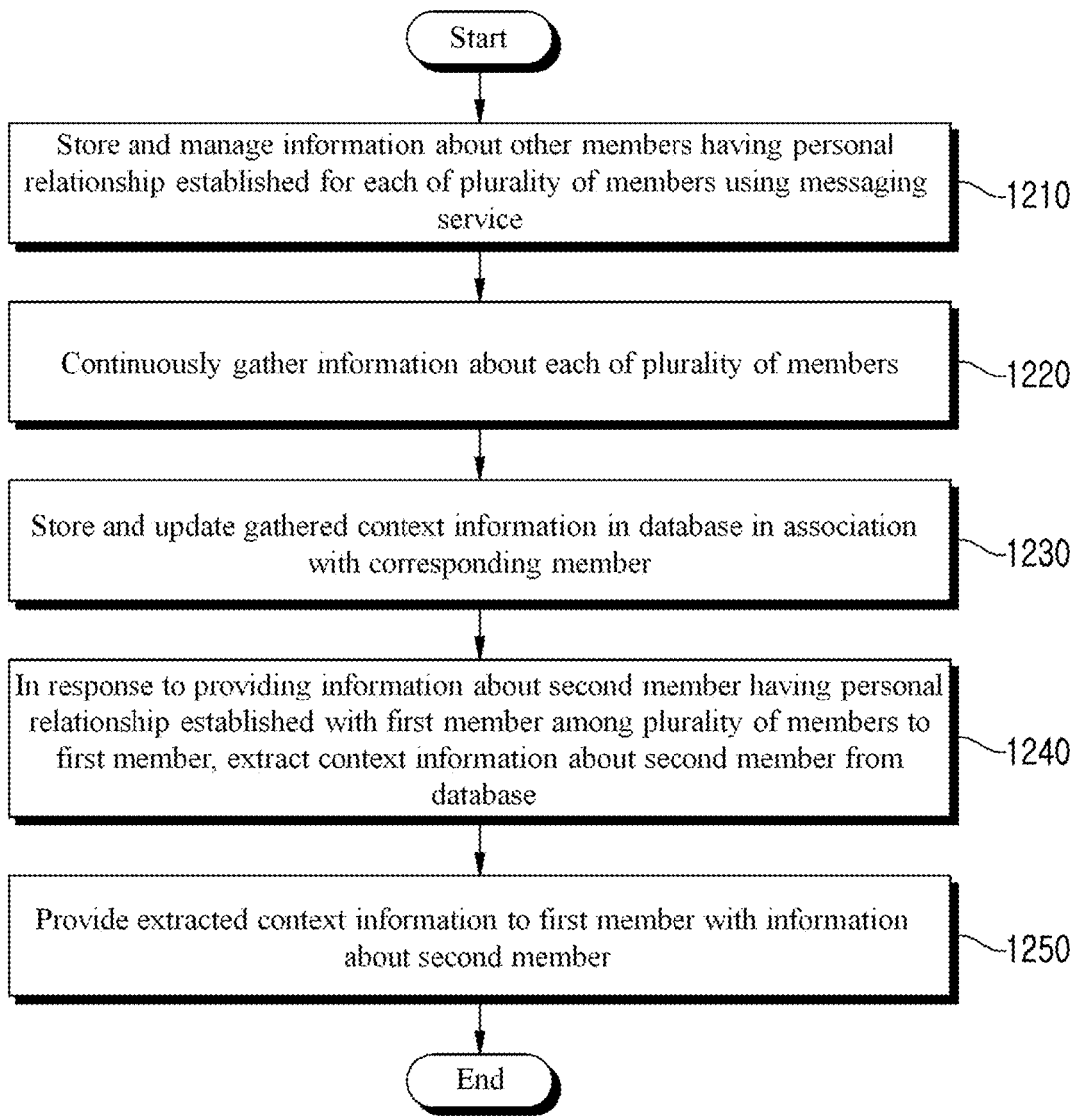

USER CONTEXT RECOGNITION IN MESSAGING SERVICE ENVIRONMENT AND INTERACTION WITH MESSAGING SERVICE BASED ON USER CONTEXT RECOGNITION

CROSS-REFERENCE TO RELATED APPLICATIONS

This U.S. non-provisional application is a continuation application of, and claims the benefit of priority under 35 U.S.C. § 365(c) to International Application PCT/KR2018/000628, which has an International filing date of Jan. 12, 2018 and the benefit of priority under 35 U.S.C. § 119 to Korean Patent Application No. 10-2020-7014342 filed on May 19, 2020 in the Korean Intellectual Property Office (KIPO), the disclosure of each of which is incorporated herein by reference in its entirety.

BACKGROUND

Technical Field

One or more example embodiments relate to technique for a user context detection and interaction with a messaging service based on a user context in a messaging service environment, and more particularly, to an interaction method capable of inferring a current context of a user based on current information and recent records acquirable from a mobile device and variously interacting with a messaging service using the inferred context of the user, a computer apparatus for performing the interaction method, and/or a non-transitory computer readable record medium storing computer-readable instructions that, when executed by a processor, cause the processor to perform the interaction method.

Description of the Related Art

Messaging applications installed and executed on mobile devices of users for a messaging service provide various functions that allow the users to send and receive messages with other users through the mobile devices. For example, a messaging application according to the related art displays a notification window on a screen to inform reception of a message in response to receiving the message in a case in which a user is not using a mobile device, for example, when the screen of the mobile device is turned off. However, the messaging application according to the related art simply displays a notification window on a screen based on a preset function and does not consider a context of the user. For example, displaying a notification window on a screen of a mobile device in a situation in which the user is unable to view the screen of the mobile device may merely use resources of the mobile device without any significant meaning.

Also, there are related arts for recognizing a mobile device of a user or a context of the user using the mobile device and variously controlling the mobile device based on the recognized context. However, in such related arts, a mobile device may be merely used to recognize a context of a user and to determine an operation of the mobile device itself based on the recognized context of the user.

SUMMARY

The example embodiments provide an interaction method capable of inferring a current context of a user based on current information and recent records acquirable from a mobile device and variously interacting with a messaging service using the inferred context of the user, a computer apparatus for performing the interaction method, and/or a non-transitory computer readable record medium storing computer-readable instructions that, when executed by a processor, cause the processor to perform the interaction method.

According to an aspect of at least one example embodiment, there is provided an interaction method of a mobile device. The interaction method may include acquiring information associated with a context of at least one of a mobile device and a user of the mobile device under control of an application installed and executed on the mobile device in association with a messaging service, determining a context of the user based on the acquired information, verifying a function to be provided to the user through the messaging service based on the determined context of the user, dynamically determining a configuration of a user interface, based on the determined context of the user, and providing the function through the user interface of which the configuration is dynamically determined.

The determining the context of the user may comprise determining a specific context by inputting the acquired information to a classification model pre-trained to determine one context among preset contexts based on input information, and determining the specific context as the context of the user.

The function may comprise a function of providing a notification about a received message to the user through the messaging service, and the user interface may include at least two or more of a configuration of not displaying a notification window, a configuration of displaying the content of the message through the notification window, a configuration of providing content of a message and a selection interface through the notification window, or a configuration of providing the content of the message, the selection interface, and a text input interface through the notification window.

The determining of the context of the user may comprise determining one level among a plurality of levels, for example, a level of freedom, based on a device access status of the user, a device manipulation status of the user, and a text input status of the user.

The interaction method may further comprise setting the configuration of the user interface with respect to each of the plurality of levels. The providing of the function may comprise providing the function through the user interface configured based on the determined one level or a lower level than the determined one level, among the plurality of levels.

According to an aspect of at least one example embodiment, there is provided an interaction method including storing and managing information about other members having a personal relationship established for each of a plurality of members using a messaging service, continuously gathering context information about each of the plurality of members, storing and updating the gathered context information in a database in association with a corresponding member, in response to providing information about a second member having a personal relationship established with a first member among the plurality of members to the first member, extracting context information about the second member from the database, and providing the extracted context information to the first member with information about the second member.

The extracting from the database may include, in response to providing a list of other members having a personal relationship established with the first member, extracting context information about each of the other members from the database, and the providing to the first member may include providing a list linked to information of another member corresponding to the extracted context information about each of the other members to the first member.

The providing to the first member may include calculating a chat joinability score of the second member based on the extracted context information, and providing the calculated chat joinability score to the first member with information about the second member.

The interaction method may further include, in response to providing information about a chat session joined by the first member, extracting context information of each of members joining the chat session from the database, calculating a chat joinability score for the chat session based on the context information of each of the members joining the chat session, and providing the calculated chat joinability score to the first member with information about the chat session.

The interaction method may further include sorting a list of chat sessions joined by the first member based on a chat joinability score for each of the chat sessions joined by the first member, and providing the sorted list to the first member.

The calculating of the chat joinability score may include calculating the chat joinability score to increase according to an increase in a level according to context information of each of the members joining the chat session and an increase in a number of messages sent and/or received through the chat session.

The interaction method may further include providing a user interface that allows the first member to set whether to provide context information to the other members having a personal relationship established with the first member for each of the other members, through an application installed and executed on a mobile device of the first member in association with the messaging service.

The interaction method may further include determining a third member having the same context information as that of the first member or having context information defined or preset by the first member among the other members, recommending the third member to the first member; and in response to a selection on the recommended third member, creating a chat session in which the first member and the third member are participants.

The interaction method may further include selecting members having the same context information among the plurality of members and creating an anonymous chat session between the selected members.

The interaction method may further include retrieving an anonymous chat session corresponding to context information set by the first member, and providing information about the retrieved anonymous chat session to the first member.

According to an aspect of at least one example embodiment, there is provided a non-transitory computer-readable record medium storing instructions that, when executed by a processor, cause the processor to perform the interaction method.

According to an aspect of at least one example embodiment, there is provided a computer apparatus comprising at least one processor configured to execute computer-readable instructions. The at least one processor may be configured to acquire information associated with a context of at least one of a mobile device and a user of the mobile device under control of an application installed and executed on the mobile device in association with a messaging service, determine a context of the user based on the acquired information, verify a function to be provided to the user through the messaging service based on the determined context of the user, dynamically determine a configuration of a user interface based on the determined context of the user, and provide the function through the user interface of which the configuration is dynamically determined.

According to an aspect of at least one example embodiment, there is provided a computer apparatus comprising at least one processor configured to execute computer-readable instructions. The at least one processor is configured to store and manage information about other members having a personal relationship established for each of a plurality of members using a messaging service, continuously gather context information about each of the plurality of members, store and update the gathered context information in a database in association with a corresponding member, in response to providing information about a second member having a personal relationship established with a first member among the plurality of members to the first member, extract context information about the second member from the database, and provide the extracted context information to the first member with information about the second member.

According to some example embodiments, it is possible to provide a different user interface based on a context of a user in terms of providing the same function, (e.g., providing a notification, by inferring a current context of the user based on current information and recent records acquirable from a mobile device, by determining a level of freedom of the user based on a device access status, a device manipulation status, and a text input status according to the inferred context of the user, and by determining an interaction method with a messaging service based on the determined level of freedom).

According to some example embodiments, it is possible to provide status information of other users having a personal relationship established with a specific user to the specific user by gathering and managing information about contexts of users at a messaging service.

According to some example embodiments, it is possible to provide and/or display information about a chat joinability score for each of chat sessions established at a messaging service by gathering and managing information about contexts of users at the messaging service.

According to some example embodiments, it is possible to provide and/or display information about the chat concentration of participants in a chat session at a messaging service by gathering and managing information about contexts of users at the messaging service.

According to some example embodiments, it is possible to recommend a participant of a chat session based on contexts of users at a time of creating the chat session by gathering and managing information about contexts of users at the messaging service.

According to some example embodiments, it is possible to provide a function that allows users to retrieve, create, and participate in an anonymous cat session based on contexts of the users by gathering and managing information about contexts of the users at a messaging service.

BRIEF DESCRIPTION OF DRAWINGS

FIG. 12 is a flowchart illustrating another example of an interaction method according to at least one example embodiment.

DETAILED DESCRIPTION

Figure 1:
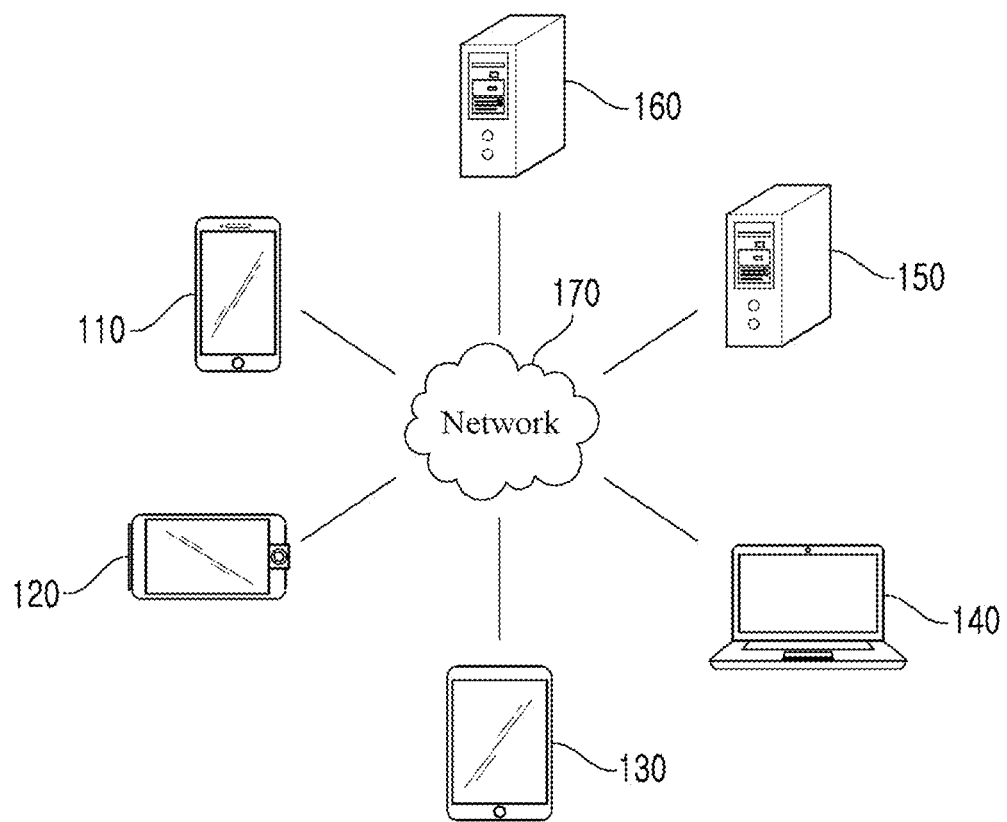
FIG. 1 is a diagram illustrating an example of a network environment according to at least one example embodiment.

One or more example embodiments will be described in detail with reference to the accompanying drawings. Example embodiments, however, may be embodied in various different forms, and should not be construed as being limited to only the illustrated example embodiments. Rather, the illustrated example embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products.

Expressions such as "at least one of," when preceding a list of elements, modify the entire list of elements and do not modify the individual elements of the list. Also, the term "exemplary" is intended to refer to an example or illustration.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

A hardware device, such as a computer processing device, may run an operating system (OS) and one or more software applications that run on the OS. The computer processing device also may access, store, manipulate, process, and create data in response to execution of the software. For simplicity, one or more example embodiments may be implemented as one computer processing device.

However, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, some example embodiments will be described with reference to the accompanying drawings.

An interaction method according to example embodiments may be configured through a computer apparatus, such as an electronic device or a server, which is described below. Here, a computer program according to an example embodiment may be installed and executed on the computer apparatus and the computer apparatus may perform the interaction method according to example embodiments under control of the executed computer program. The aforementioned computer program may be stored on a non-transitory computer-readable record medium to implement the interaction method on a computer in conjunction with the computer apparatus.

FIG. 1 illustrates an example of a network environment according to at least one example embodiment. Referring to FIG. 1, the network environment may include a plurality of electronic devices 110, 120, 130, and 140, a plurality of servers 150 and 160, and a network 170. FIG. 1 is provided as an example only. A number of electronic devices or a number of servers is not limited thereto.

Each of the plurality of electronic devices 110, 120, 130, and 140 may be a fixed terminal or a mobile terminal that is configured as a computer apparatus. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet PC, and the like. For example, although FIG. 1 illustrates a shape of a smartphone as an example of the electronic device 110, the electronic device 110 used herein may refer to one of various types of physical computer apparatuses capable of communicating with other electronic devices 120, 130, and 140, and/or the servers 150 and 160 over the network 170 in a wireless or wired communication manner.

The communication scheme is not limited and may include a near field wireless communication scheme between devices as well as a communication scheme using a communication network (e.g., a mobile communication network, wired Internet, wireless Internet, and a broadcasting network) includable in the network 170. For example, the network 170 may include at least one of network topologies that include a personal area network (PAN), a local area network (IAN), a campus area network (CAN), a metropolitan area network (MAN), a wide area network (WAN), a broadband network (BBN), and Internet. Also, the network 170 may include at least one of network topologies that include a bus network, a star network, a ring network, a mesh network, a star-bus network, a tree or hierarchical network, and the like. However, they are provided as examples only.

Each of the servers 150 and 160 may be configured as a computer apparatus or a plurality of computer apparatuses that provides an instruction, a code, a file, content, a service, etc., through communication with the plurality of electronic devices 110, 120, 130, and 140 over the network 170. For example, the server 150 may be a system that provides a first service to the plurality of electronic devices 110, 120, 130, and 140 connected over the network 170 and the server 160 may be a system that provides a second service to the plurality of electronic devices 110, 120, 130, and 140 connected over the network 170. For example, the first service may be a social network service (SNS). In this case, the server 150 may provide various services providable as the SNS, such as a messaging service and a timeline service, to the plurality of electronic devices 110, 120, 130, and 140 each on which an application linked to the service is installed, through the application. Also, the server 160 may provide a service for distributing an installation file for installing the application to the plurality of electronic devices 110, 120, 130, and 140 as the second service.

Figure 2:
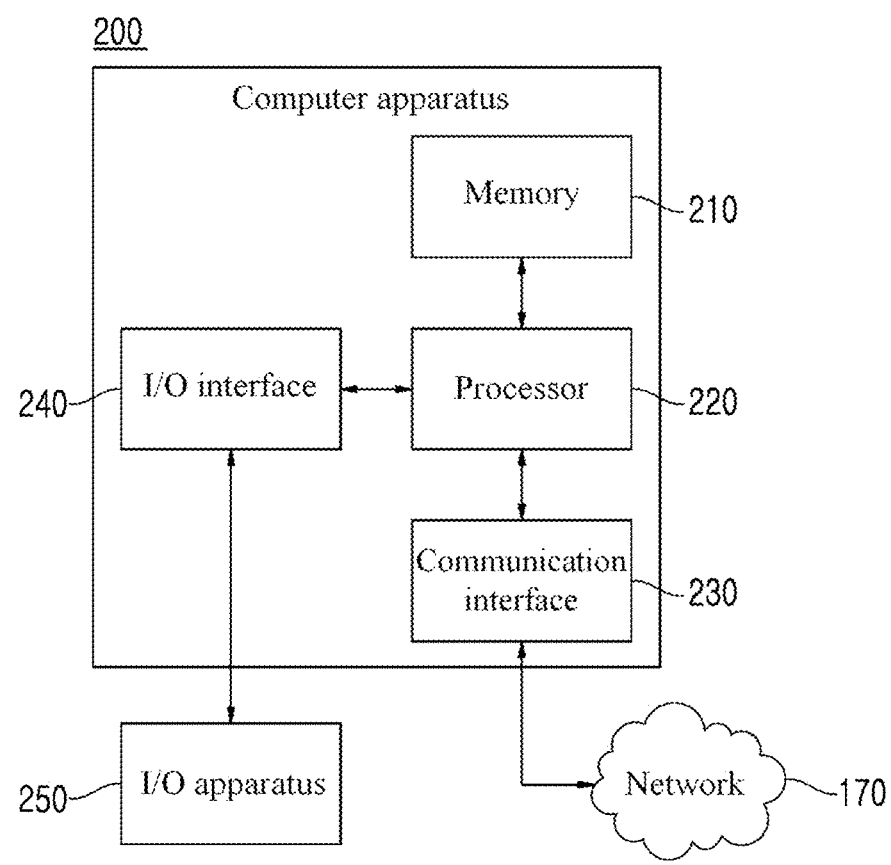
FIG. 2 is a diagram illustrating an example of a computer apparatus according to at least one example embodiment.

FIG. 2 is a block diagram illustrating an example of a computer apparatus according to at least one example embodiment. Each of the electronic devices 110, 120, 130, and 140 or each of the servers 150 and 160 may be implemented by a computer apparatus 200 of FIG. 2. For example, a computer program according to an example embodiment may be installed and executed on the computer apparatus 200. The computer apparatus 200 may perform an interaction method according to some example embodiments under control of the executed computer program.

Referring to FIG. 2, the computer apparatus 200 may include a memory 210, a processor 220, a communication interface 230, and an input/output (I/O) interface 240. The memory 210 may include a permanent mass storage device, such as random access memory (RAM), a read only memory (ROM), a disk drive, etc., as a non-transitory computer-readable record medium. The permanent mass storage device, such as ROM and disk drive, may be included in the computer apparatus 200 as a permanent storage device separate from the memory 210. Also, an OS and at least one program code may be stored in the memory 210. Such software components may be loaded to the memory 210 from another non-transitory computer-readable record medium separate from the memory 210. The other non-transitory computer-readable record medium may include a non-transitory computer-readable record medium, for example, a floppy drive, a disk, a tape, a DVD/CD-ROM drive, a memory card, etc. According to other example embodiments, software components may be loaded to the memory 210 through the communication interface 230, instead of the non-transitory computer-readable record medium. For example, the software components may be loaded to the memory 210 of the computer apparatus 200 based on a computer program installed by files provided over the network 170.

The processor 220 may be configured to process instructions of a computer program by performing basic arithmetic operations, logic operations, and I/O operations. The computer-readable instructions may be provided from the memory 210 or the communication interface 230 to the processor 220. For example, the processor 220 may be configured to execute received instructions in response to the program code stored in the storage device, such as the memory 210.

The communication interface 230 may provide a function for communication between the computer apparatus 200 and another apparatus, for example, the aforementioned storage devices, over the network 170. For example, the processor 220 of the computer apparatus 200 may transfer a request or an instruction created based on a program code stored in the storage device such as the memory 210, data, a file, etc., to other apparatuses over the network 170 under control of the communication interface 230. Inversely, the computer apparatus 200 may receive a signal, an instruction, data, a file, etc., from another apparatus through the communication interface 230 of the computer apparatus 200 by going through the network 170. For example, a signal, an instruction, data, etc., received through the communication interface 230 may be transferred to the processor 220 or the memory 210, and a file, etc., may be stored in a storage medium, for example, the permanent storage device, further includable in the computer apparatus 200.

The I/O interface 240 may be a device used for interface with an I/O apparatus 250. For example, an input device may include a device, such as a microphone, a keyboard, a mouse, etc., and an output device may include a device, such as a display, a speaker, etc. As another example, the I/O interface 240 may be a device for interface with an apparatus in which an input function and an output function are integrated into a single function, such as a touchscreen. The I/O apparatus 250 may be configured as a single device with the computer apparatus 200.

According to other example embodiments, the computer apparatus 200 may include a smaller or greater number of components than the number of components shown in FIG. 2. However, there is no need to clearly illustrate many components according to the related art. For example, the computer apparatus 200 may include at least a portion of the I/O apparatus 250, or may further include other components, for example, a transceiver, a database (DB), and the like.

Figure 3:
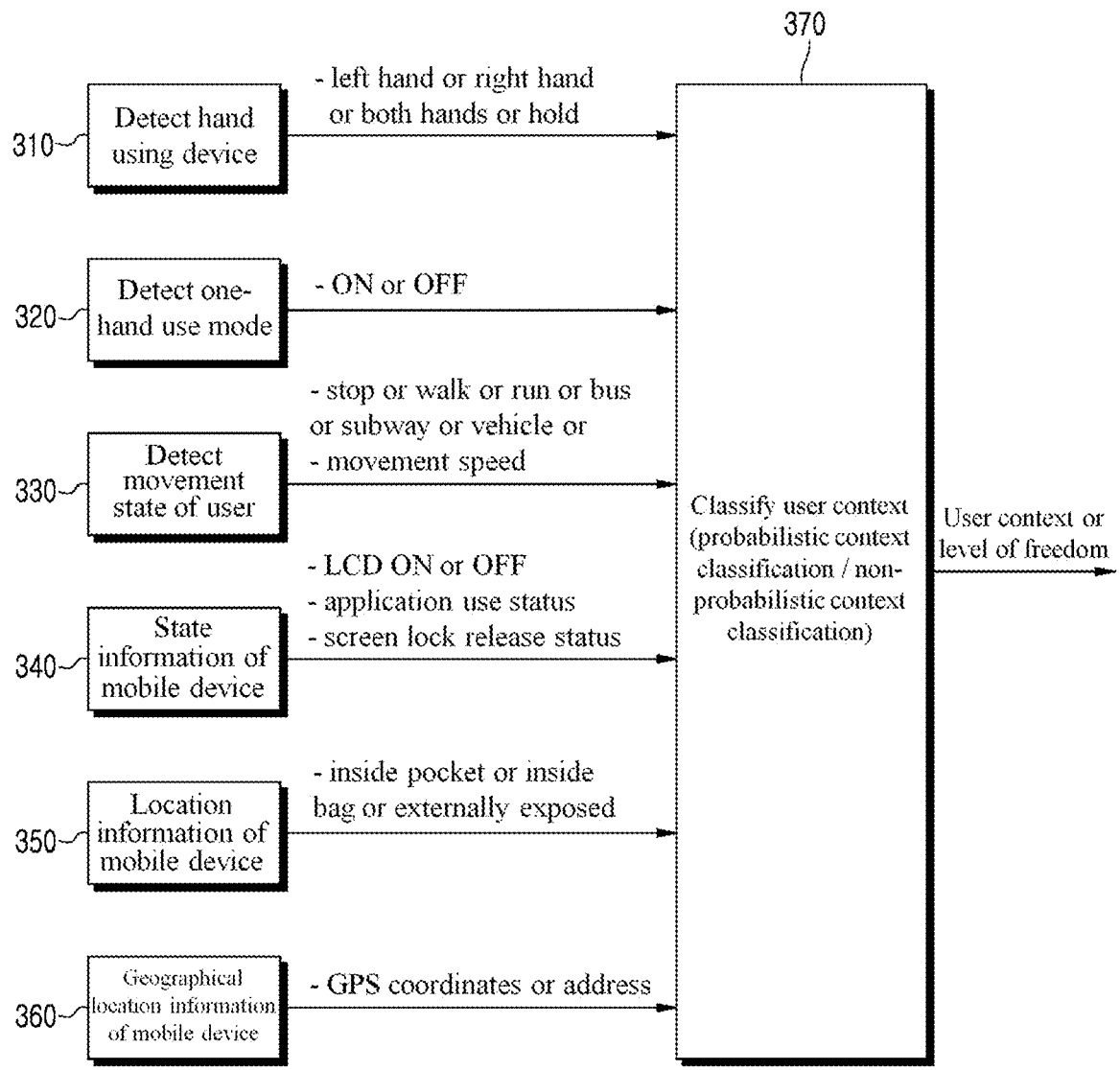
FIG. 3 illustrates an example of a process of detecting a context of a user according to at least one example embodiment.

FIG. 3 illustrates an example of a process of detecting a context of a user according to at least one example embodiment. FIG. 3 illustrates a first process 310 to a seventh process 370.

The first process 310 may be an example of a process of detecting a hand of a user using a mobile device. The mobile device may provide information about the hand of the user using the mobile device through an acceleration sensor and a gyro sensor. For example, information about at least one of states "left hand," "right hand," "both hands," and "hold." "Left hand" may represent a state in which the user is using the mobile device with the left hand, "right hand" may represent a state in which the user is using the mobile device with the right hand, "both hands" may represent a state in which the user is using the mobile device with both hands, and "hold" may represent a state in which the user is using the mobile device without holding the mobile device. For example, in the case of typing by manipulating the mobile device with one hand, an orientation in which shaking or vibration is prominent or relatively strong based on a central axis of the mobile device and/or an orientation of the mobile device (e.g., a vertical direction or a horizontal direction) may be verified through the acceleration sensor and/or the gyro sensor. The verified orientation may be compared to a data set pre-stored in association with a one-hand device use pattern to determine which hand is being used or whether both hands are being used to hold the mobile device.

The second process 320 may be an example of a process of detecting whether a one-hand use mode is in use. The one-hand use mode may be a mode for providing a function that allows the user to be capable of controlling the mobile device through a specific mobile device or a specific application, and the mobile device may provide information about whether the one-hand use mode is in an ON state or in an OFF state. Here, if the mobile device does not provide the one-hand use mode, the mobile device may be regarded to be in an OFF state.

The third process 330 may be an example of a process of detecting a movement state of the user. The mobile device may provide information about a current movement state of the user through the third process 330. Examples of the movement state may include one of "stop," "walk," "run," "bus," "subway," "vehicle," and "bicycle." Also, the third process 330 may further provide information about a movement speed of the user. For example, the mobile device may acquire information about a movement speed of the mobile device based on a change in a geographical location (e.g., latitudinal/longitudinal coordinates) of the mobile device provided through information of a global positioning system (GPS) and a base station of a neighboring wireless telephone network or wireless fidelity (WiFi) access points (APs). Also, the mobile device may acquire information about the movement state of the user based on the acquired movement speed and/or a vibration of the mobile device or a pattern of the vibration measured using the acceleration sensor and/or the gyro sensor included in the mobile device. Technology for acquiring information about a movement speed or a movement state may be easily understood by those skilled in the art from the known arts, such as, for example, 'Google Activity Recognition Application Programming Interface (API).'

The fourth process 340 may be an example of a process of detecting state information of the mobile device. The mobile device may provide at least one of information about ON or OFF of a liquid crystal display (LCD), information regarding whether an application is currently being used by the user (e.g., information about the application that is currently being used by the user if the application is being used, or information regarding whether a specific application operates on a foreground or a background), and information about a release status of a screen lock.

The fifth process 350 may be an example of a process of detecting location information of the mobile device. Here, the location information may include information, such as, for example, inside a pocket of clothing worn by the user, inside a bag carried by the user, or externally exposed, instead of including a geographical location. For example, the mobile device may detect and provide location information of the mobile device using, for example, an acceleration sensor, an illuminance sensor, a microphone, and a near field sensor.

The sixth process 360 may be an example of a process of detecting geographical location information of the mobile device. The mobile device may acquire and provide geographical location information, such as current latitudinal/longitudinal location information of the mobile device using a variety of information, for example, a GPS, WiFi positioning, and a base station. Also, the sixth process 360 may provide information about a use status of geographical location information. For example, if the user is using a navigation app, it may be determined that the user is using the geographical location information.

The aforementioned techniques for the first process 310 to the sixth process 360 may be easily understood by those skilled in the art from the known arts. For example, a technique for detecting the movement state of the user through the third process 330 may be easily understood by those skilled in the art through 'Google Activity Recognition API.' Some example embodiments relate to methods of using such acquired information to automatically detect and use a context of the user, not a method of acquiring such individual information. Also, those skilled in the art may easily understand that, depending on example embodiments, only a portion of the first process 310 to the sixth process 360 may be performed or a new process of acquiring another information may be added.

The seventh process 370 may be an example of a process of determining a user context based on information provided through the first process 310 to the sixth process 360. The seventh process 370 may be performed through the mobile device and, depending on example embodiments, may be performed through a server (e.g., the server 150) that receives information provided through the mobile device through the first process 310 to the sixth process 360. The user context may be determined by employing a non-probabilistic classification model or a classification model using a probability as classification methods using machine learning.

For example, a naive Bayes classification may be used for the classification model using the probability. The naive Bayes classification refers to a type of a probability classifier that applies Bayes' theorem that assumes independence between features.

The naive Bayes refers to a conditional probability model and represents instances to be classified as a vector $x=(x_1, \ldots, x_n)$ that represents N features (dependent variables), and a naive Bayes classifier allocates k available probability results (classes) using the vector, as represented by the following Equation 1.

$$p(C_k|x_1, \ldots, x_n) \quad \text{[Equation 1]}$$

In Equation 1, if a number of features N is large or if a single feature is capable of having a large number of values, it may be difficult to immediately apply a Bayesian model to a probability table. Accordingly, using Bayes' theorem and conditional probability, Equation 1 may be arranged to the following Equation 2.

$$p(C_k|x) = \frac{p(C_k)p(x|C_k)}{p(x)}. \quad \text{[Equation 2]}$$

Using Bayesian probability terms, the above Equation 2 may be represented as the following Equation 3.

$$\text{posterior} = \frac{\text{prior} \times \text{likelihood}}{\text{evidence}}. \quad \text{[Equation 3]}$$

In Equation 3, 'posterior' denotes a posterior probability, 'likelihood' denotes a prior likelihood, and 'evidence' denotes an observance value.

Actually, in the above Equation 3, only a numerator part is meaningful since a denominator part does not depend on a given C value and a value $F_i$ of features is given such that a value of a denominator becomes constant. The numerator part is a joint probability model represented by the following Equation 4.

$$p(C_k, x_1, \ldots, x_n) \quad \text{[Equation 4]}$$

Here, Equation 4 may be rearranged to the following Equation 5 by using a chain rule that repeatedly applies a conditional probability.

$$\begin{aligned}p(C_k, x_1, \ldots, x_n) &= p(C_k)p(x_1, \ldots, x_n | C_k) \quad \text{[Equation 5]}\\ &= p(C_k)p(x_1 | C_k)p(x_2, \ldots, x_n | C_k, x_1)\\ &= p(C_k)p(x_1 | C_k)p(x_2 | C_k, x_1)\\ &\quad p(x_3, \ldots, x_n | C_k, x_1, x_2)\\ &= p(C_k)p(x_1 | C_k)p(x_2 | C_k, x_1) \ldots\\ &\quad p(x_n | C_k, x_1, x_2, x_3, \ldots, x_{n-1})\end{aligned}$$

In naive Bayes, conditional independence may be represented by the following Equation 6.

$$p(x_i|C_k,x_j)=p(x_i|C_k),$$
$$p(x_i|C_k,x_j,x_k)=p(x_i|C_k),$$
$$p(x_i|C_k,x_j,x_k,x_l)=p(x_i|C_k), \quad \text{[Equation 6]}$$

Here, if category type C is given, any feature $F_i$ may be conditionally independent for all $F_j (j \neq i)$. That is, Equation 6 may be established for k and l, which $j \neq i$. Based thereon, the joint model may be represented by the following Equation 7.

$$\begin{aligned}p(C_k | x_1, \ldots, x_n) &\propto p(C_k, x_1, \ldots, x_n) \propto \quad \text{[Equation 7]}\\ &p(C_k)p(x_1 | C_k)p(x_2 | C_k)p(x_3 | C_k) \ldots \propto\\ &p(C_k)\prod_{i=1}^{n} p(x_i | C_k).\end{aligned}$$

The conditional distribution of class variable C in Equation 7 may be represented by the following Equation 8 under the assumption of independence.

$$p(C_k | x_1, \ldots, x_n) = \frac{1}{Z}p(C_k)\prod_{i=1}^{n} p(x_i | C_k) \quad \text{[Equation 8]}$$

In Equation 8, Z=p(x) denotes a scaling factor that becomes a constant if feature values are given. In other words, Z=p(x) denotes a scaling factor that only depends on $x_1, \ldots, x_n$.

The naive Bayes classification relates to combination of a probability model and a decision rule. A single common rule is to select a most likely hypothesis. It is to select a maximum value of a posterior decision rule or a Maximum A Posteriori (MAP) decision rule. That is, the naive Bayes classification finds a class k having the maximum probability with respect to $C_k$ through the following Equation 9.

$$\hat{y} = \underset{k \in \{1, \ldots, K\}}{\operatorname{argmax}} p(C_k)\prod_{i=1}^{n} p(x_i | C_k). \quad \text{[Equation 9]}$$

For example, in the seventh process 370, the computer apparatus 200 may gather a number of event occurrences for each context with the assumption that a context according to information provided through each of the first process 310 to the sixth process 360 is an independent event. Also, the computer apparatus 200 may calculate an occurrence probability based on the number of event occurrences and may generate an event model by calculating a probability of an individual context for a desired result value. Next, the computer apparatus 200 may input a context event for a test and may estimate a result value through the generated event model.

Also, a support vector machine (SVM) may be used for a non-probabilistic classification model. The SVM refers to a supervised learning model for pattern recognition and data analysis as one of machine learning fields and is generally used for classification and regression analysis. If a set of data belonging to one of two categories is given, an SVM algorithm generates a non-probabilistic binary linear classification model configured to determine a category to which new data belongs based on the given set of data. The generated classification model is represented as a boundary in a space on which data is mapped. Here, the SVM algorithm refers to an algorithm that finds a boundary having a largest width. The SVM may be used for non-linear classification as well as linear classification. For the non-linear classification, given data needs to be mapped on a high-dimensional feature space. To effectively perform this, Kernel tricks may be used.

For example, in the seventh process 370, the computer apparatus 200 may consecutively classify a set of data (a vector of data) corresponding to information provided through the first process 310 to the sixth process 360 into categories and may determine a context (category) of the user corresponding to the set of data.

The seventh process 370 may be performed by the computer apparatus 200 that includes the event model. The computer apparatus 200 may be the mobile device of the user, or may be the server 150 that receives information from the mobile device over the network 170. For example, the computer apparatus 200 may provide information about the overall context of the user or information such as the following level of freedom by combining individual contexts provided through the first process 310 to the sixth process 360. For example, in the seventh process 370, the computer apparatus 200 may classify a device access status of the user, a device manipulation status of the user, a text input status of the user through the event model and may provide a level of freedom as an example of a result value. The following Table 1 shows an example of determining a level of freedom including 4 stages based on a user context.

TABLE 1

| Level of freedom | Device access | Device manipulation | Text input |
| --- | --- | --- | --- |
| 1 | X | X | X |
| 2 | O | X | X |
| 3 | O | O | X |
| 4 | O | O | O |

For example, a situation in which the user is standing on the way to work in a bus and the mobile device is in a bag may be considered as a first example condition. The mobile device may provide information about a movement state (e.g., "in a bus" and a moving speed is 50 km per hour) of the user through the third process 330, may provide information indicating that the user is not using any application for 30 minutes through the fourth process 340, and may verify and provide location information of the mobile device as "bag" through the fifth process 350. In this case, the event model may determine each of the device access status, the device manipulation status, and the text input status for the first example context and may determine a level of freedom of the first example context as "1" based on the determination and Table 1.

A situation in which the user is using the mobile device mounted to a bicycle for the purpose of navigation while riding the bicycle may be considered as a second example context. Here, information provided from the mobile device may include information, for example, "bicycle," "externally exposed," "moving at a middle speed," "LCD ON," "being mounted," and "using a navigation application." In this case, the event model may determine a level of freedom of the second example context as "2" based on the determination that the user is accessible to the mobile device, but, is difficult to manipulate the mobile device and to input texts.

A situation in which the user is walking down the street while holding the mobile device in one hand may be considered as a third example context. Here, information provided from the mobile device may include, for example, "walking," "externally exposed," "moving at a low speed," "LCD OFF," "presence of application use record within 10 minutes," and "one hand." In this case, the event model may determine a level of freedom of the third example context as "3" based on the determination that the user may access and manipulate the mobile device, but, is difficult to input texts.

A situation in which the user is using the mobile device with seating in the office may be considered as a fourth example context. Here, information provided from the mobile device may include information, for example, "stop," "LCD ON," "both hands," "using an application," and "not using location information." In this case, the event model may determine a level of freedom of the fourth example context as "4" based on the determination that the user may access the mobile device, manipulate the mobile device, and input texts.

Although Table 1 represents an example of classifying a level of freedom into 4 stages based on a device access status, a device manipulation status, and a text input status, those skilled in the art may easily understand that a condition or a stage of a level of freedom may be variously set.

FIGS. 4 to 8 illustrate examples of providing a different user interface based on a level of freedom according to at least one example embodiment.

Figure 4:
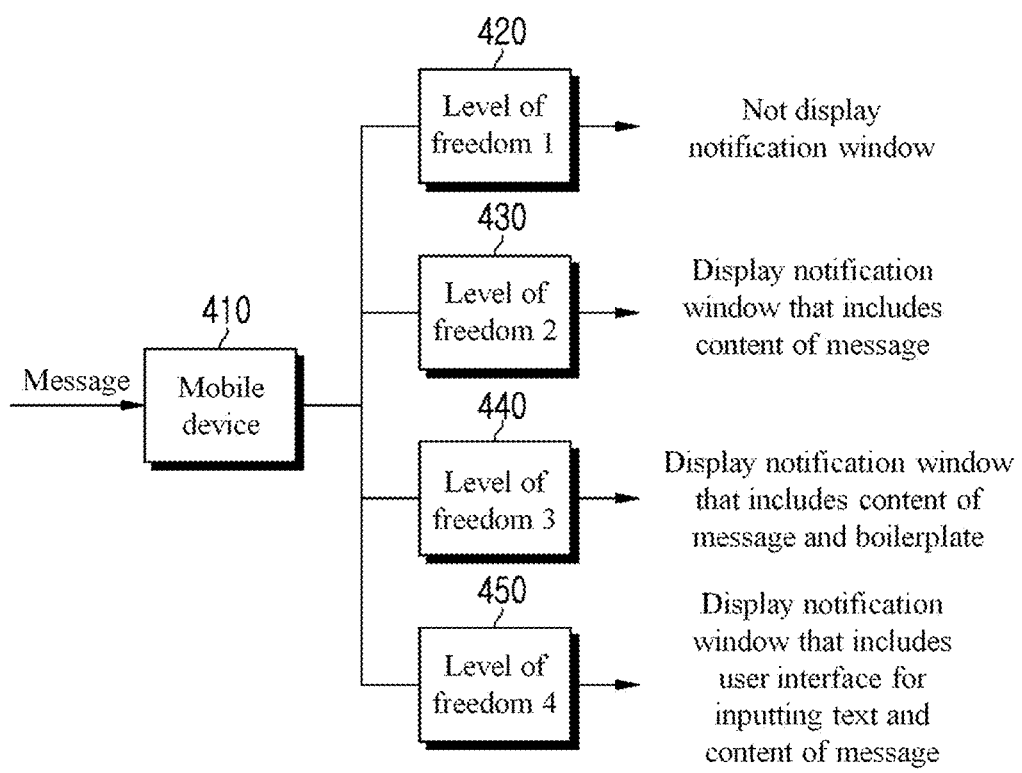
FIGS. 4 to 8 illustrate examples of providing a different user interface based on a level of freedom according to at least one example embodiment.

An example of using a level of freedom to provide a notification window to a user in response to receiving a message is described with reference to FIG. 4. FIG. 4 illustrates examples of providing a different user interface based on a current level of freedom of the user in response to receiving a message at a mobile device 410 through a messaging service.

Figure 5:
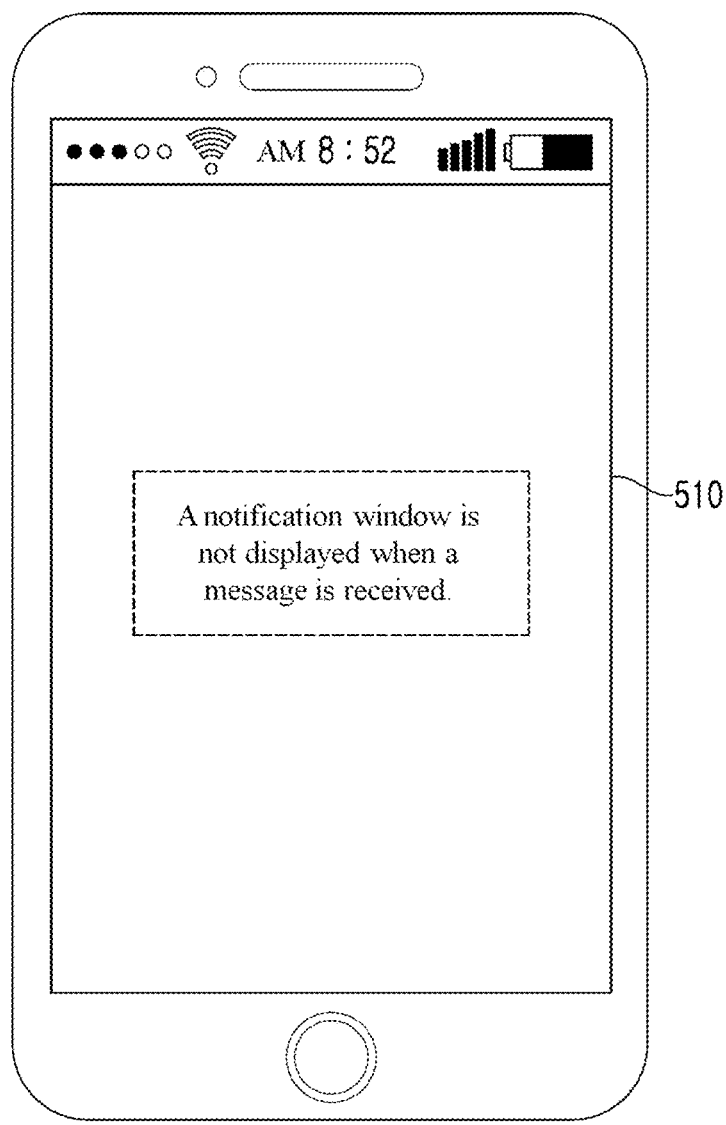

Referring to FIG. 4, in the case of a level of freedom "1" 420, the user is in a difficult state to perform a device access, a device manipulation, and a text input. Therefore, it is no special meaning or it is of no practical use in displaying a notification window on a screen. In this case, the mobile device 410 may not display the notification window. FIG. 5 illustrates an example of a screen 510 of the electronic device 110 on which a notification window is not displayed although a message is received.

Figure 6:
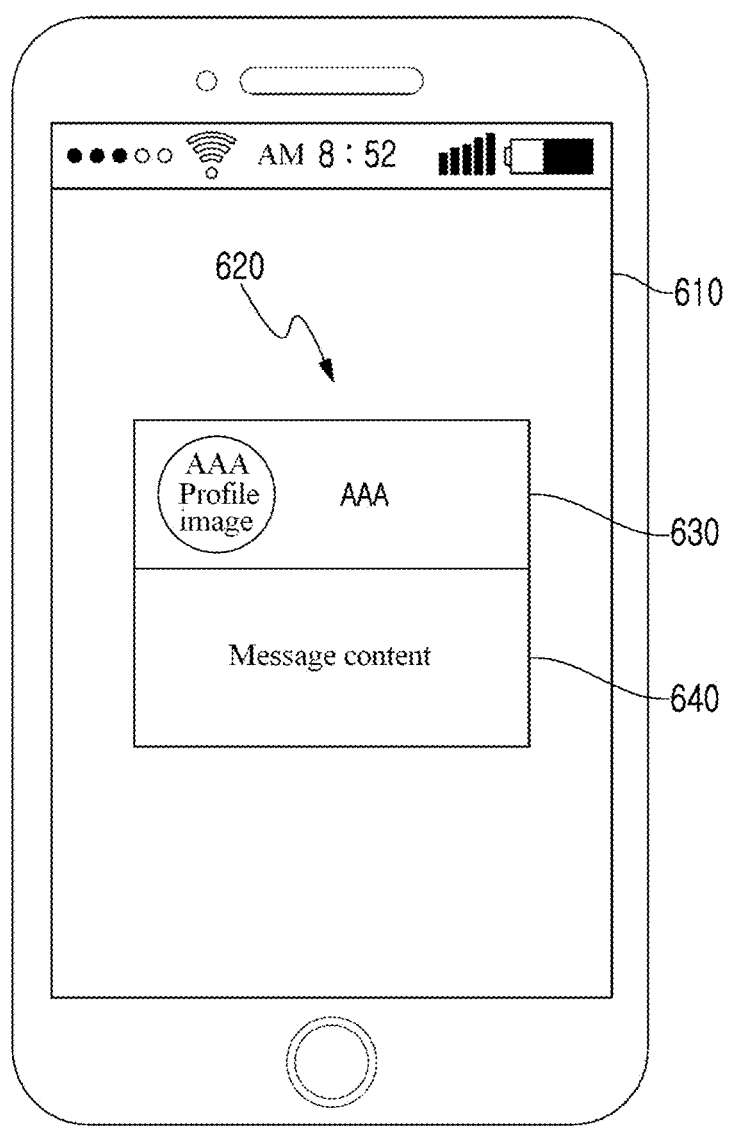

In the case of a level of freedom "2" 430, the user may perform a device access, but may not readily, that is, is in a difficult state to perform a device manipulation and a text input. In this case, that the device access is possible represents that the user may view information displayed on a device screen, and accordingly the mobile device 410 may display a notification window including content of the message. FIG. 6 illustrates an example of a screen 610 of the electronic device 110 on which a notification window 620 is displayed in response to receiving a message. Here, because the user may not readily perform the device manipulation, FIG. 6 illustrates an example in which information 630 about a sender of a message and message content 640 are displayed on the notification window 620 without a need to provide a separate user interface through the notification window 620.

Figure 7:
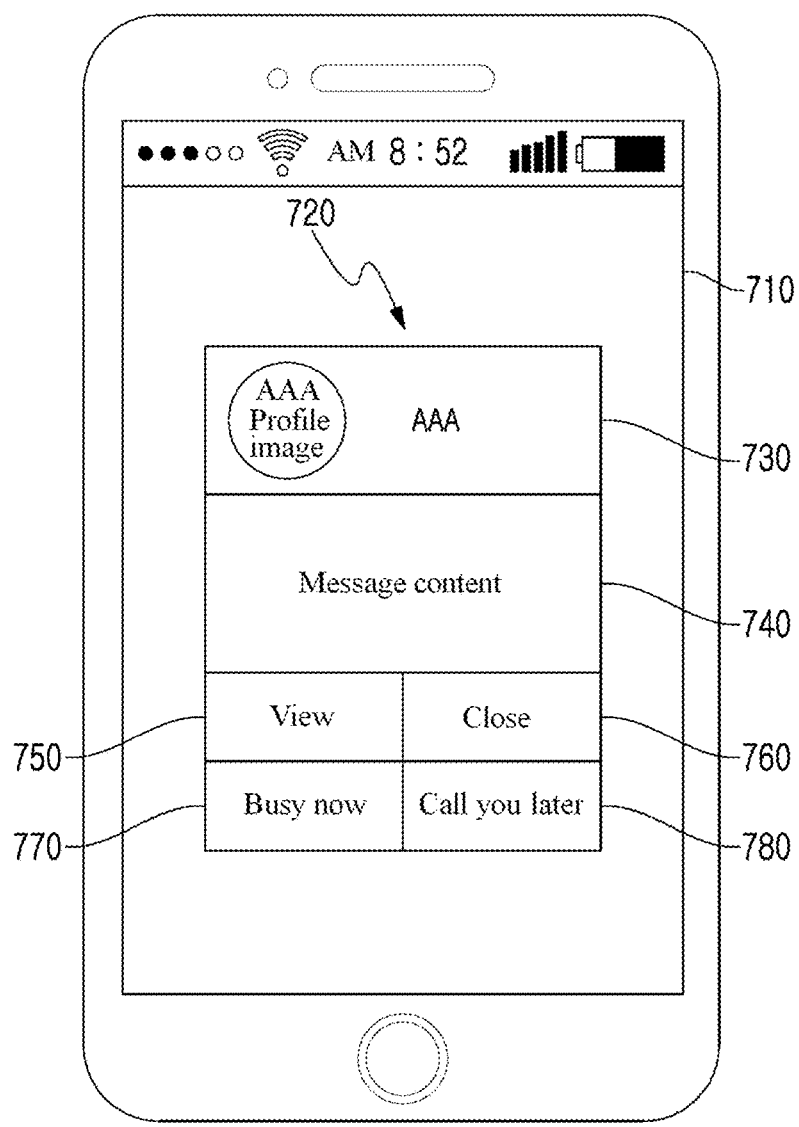

In the case of a level of freedom "3" 440, the user may perform a device access and a device manipulation, but may not readily perform a text input. In this case, the user may manipulate the mobile device 410 using at least one hand, and accordingly the mobile device 410 may provide content of a message on a screen and may also provide user interfaces for providing functions controllable through simple input. FIG. 7 illustrates an example of a screen 710 of the electronic device 110 on which a notification window 720 is displayed. Here, since the user may perform a simple device manipulation, the notification window 720 of FIG. 7 may be configured to display information 730 about a sender of a message and message content 740 and to further include a user interface 750 for viewing the message through a chatroom of a messenger and a user interface 760 for closing the notification window 720. Further, the notification window 720 may be configured to further include user interfaces 770 and 780 for sending desired or preset boilerplates "busy now" and "call you later." If the user selects one of the user interfaces 770 and 780, for example, if the user touches an area on which a corresponding user interface is displayed in a touchscreen environment, the electronic device 110 may send a message including the boilerplate corresponding to the selected user interface to a recipient corresponding to the information 730 about the sender. Also, if the user is driving or if a portable terminal is inside a bag, based on information received from a GPS and a base station of a neighboring wireless telephone network or a luminance sensor, that is, if it is determined that the user is in a state to be incapable of selecting the boilerplate, the electronic device 110 may automatically send the corresponding boilerplate without receiving a selection from the user.

Figure 8:
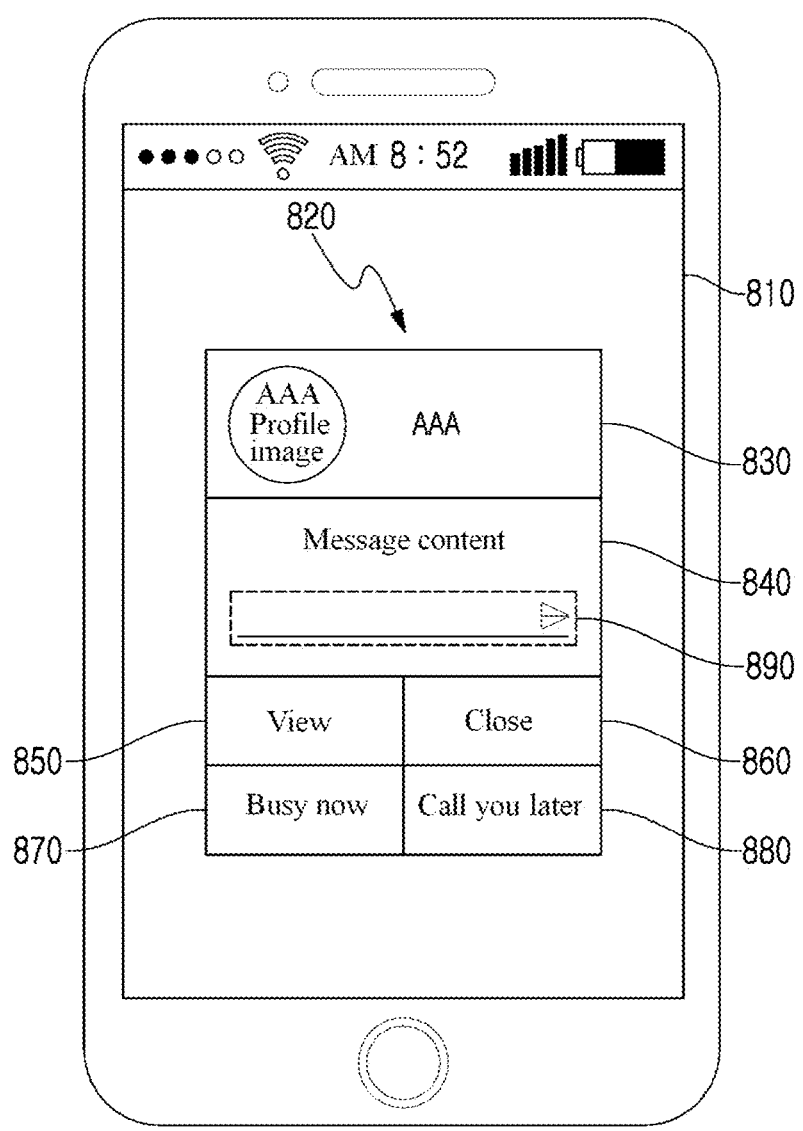

In the case of a level of freedom "4" 450, the user is in a state allowed to perform all of a device access, a device manipulation, and a text input. In this case, the user may view content of a received message, and if desired, may directly input and send an answer. Accordingly, the mobile device 410 may further provide a user interface that allows the user to directly input an answer through a notification window. FIG. 8 illustrates an example of a screen 810 of the electronic device 110 on which a notification window 820 is displayed in response to receiving a message. As described above, the user is in a state allowed to perform all of the device access, the device manipulation, and the text input, information 830 about a sender of the message and message content 840 are displayed on the notification window 820. Also, the notification window 820 may provide simple user interfaces 850, 860, 870, and 880 and may further provide a text input interface such that the user may input an answer to the message as represented by a box 890 indicated with dotted lines. For example, if the user selects an area on which the box 890 is displayed, a function for inputting a text may be provided to the user.

According to the example embodiment, even in the case of providing a single function in association with the messaging service, various user interfaces may be provided based on a level of freedom determined based on a context of a user. Those skilled in the art may easily understand from the aforementioned example embodiments that such a level of freedom may variously apply to various functions associated with the messaging service.

Hereinafter, various example embodiments regarding using a context of a user are described.

Figure 9:
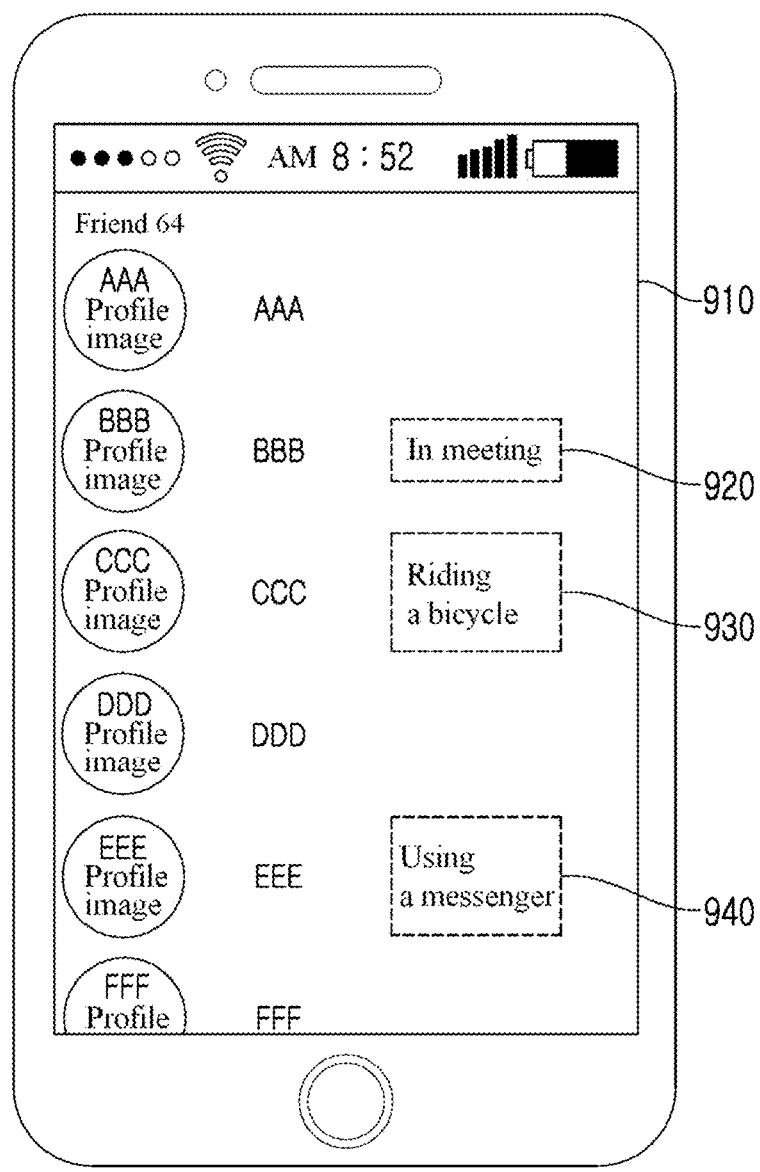
FIG. 9 illustrates an example of displaying status information of another user according to at least one example embodiment.

FIG. 9 illustrates an example of displaying status information of another user according to at least one example embodiment. As described above, in addition to a mobile device of a user, the server 150 that provides a messaging service may also acquire detailed contexts of users using the messaging service. FIG. 9 illustrates an example of providing a list of other users having a personal relationship established with the user through a screen 910 of the electronic device 110. Here, information about a context of at least one another user may be displayed. Referring to FIG. 9, information about contexts of other users may be provided by notifying that another user BBB is "in meeting" as shown in a first box 920 indicated with dotted lines, another user CCC is "riding a bicycle" as shown in a second box 930 indicated with dotted lines, and another user EEE is "using a messenger" as shown in a third box 940 as indicated with dotted lines.

To this end, the server 150 may receive, from mobile devices of such users, information gathered through the first process 310 to the sixth process 360 of FIG. 3 over the network 170, and may classify the contexts of the users through the seventh process 370. Also, once each of the mobile devices of the users classifies a context of a corresponding user through the first process 310 to the sixth process 360, the server 150 may receive and use information about the classified context of the user.

As described above, in providing a list of other users having a personal relationship established with the user through the messaging service, the server 150 may also provide context information of at least one another user and the mobile device may display, on a screen, a list that includes the context information of the at least one other user and information of the corresponding other user under control of a messenger application installed and executed on the mobile device. Here, the displayed context information may not need to include all of the context information gathered for the other user. The server 150 may selectively provide representative context information among a plurality of pieces of context information gathered for the other user.

Also, the mobile device may provide a user interface capable of setting another user to display context information of the user through the messenger application. For example, FIG. 9 may represent an example in which one or more other users BBB, CCC, and EEE set their context information to be provided to the user of the electronic device 110. Such displaying of context information may allow users to sympathize with providing information through context information with other users having a personal relationship (in other words, may allow users to provide context information to other users having a personal relationship) although a chat is not ongoing between the users through the messaging service.

As another example, the server 150 may display a chat joinability score of each chatroom through a list of chatrooms (chat sessions). For example, the server 150 may calculate a probability that (or a degree to which) the user is likely to join or participate/engage in a chat in a corresponding chat session as a numerical value based on context information of each of participants of a specific chat session, and may provide the calculated probability as a chat joinability score.

Figure 10:
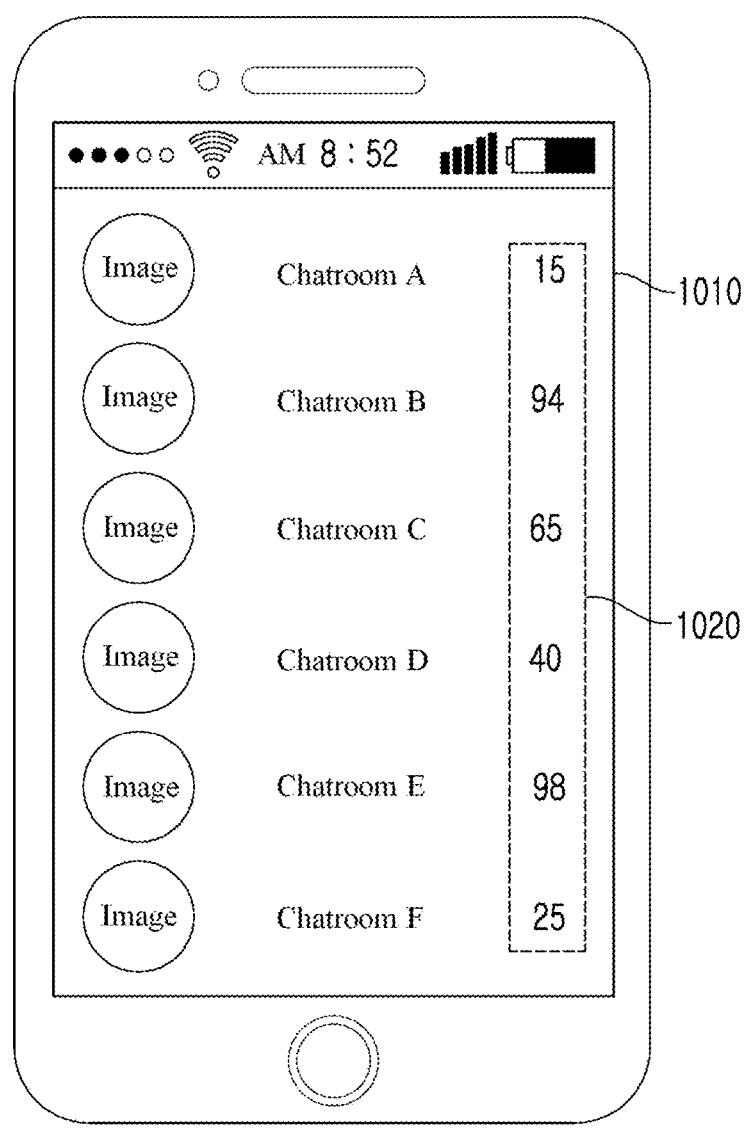
FIG. 10 illustrates an example of providing a chat joinability score according to at least one example embodiment.

FIG. 10 illustrates an example of providing a chat joinability score according to at least one example embodiment. FIG. 10 illustrates an example of a screen 1010 of the electronic device 110 on which a list of chat sessions (chatrooms) including the user as a participant is displayed. Here, a box 1020 indicated with dotted lines represents chat joinability scores of the respective chat sessions. FIG. 10 illustrates an example in which a chat joinability score is determined as a numerical value between 0 and 100. Here, as the chat joinability score increases, it may represent that the user is highly likely to participate in a chat in a corresponding chatroom. For example, if all of participants of a chatroom are busy, the user may not readily receive an answer although the user joins the chatroom and sends a message. Therefore, a corresponding chat joinability score may be set to be relatively low. Depending on some example embodiments, a chat joinability score may be represented using color (e.g., red, yellow, and green) or a level (e.g., three stages including high, mid, and low), instead of using a numerical value.

A chat joinability score may be determined based on a level of freedom of each of participants present in a chat session and a record about messages sent from and received by each of the participants in a chatroom. For example, the server 150 may set a chat joinability score to a relatively high value according to an increase in levels of freedom of participants present in a chat session and an increase in a number of times each of the participants sends/receives messages for a current preset period of time (of alternatively, for a desired period of time).

Also, the server 150 may sort and provide chatrooms included in a chatroom (chat session) list based on chat joinability scores. That is, a list in which chatrooms are sorted in order of chatrooms where as many users can immediately join may be provided to the user. Also, the server 150 may provide a list that includes only chatrooms having at least a preset (or alternatively, desired) chat joinability score value among the chatrooms sorted based on the chat joinability scores or may provide a list that includes only a preset (or alternatively, desired) number of chatrooms in descending order of chat joinability scores among the chatrooms sorted based on the chat joinability scores.

A chat joinability score may be set for each user. For example, instead of displaying context information of other users having a personal relationship with a specific user, as illustrated in FIG. 9, a chat joinability score for each user may be calculated and displayed. In this case, the chat joinability score of each user may be determined based on a level of freedom and message transmission and reception record of a corresponding user. For example, the server 150 may set a chat joinability score to a relatively high value according to an increase in a level of freedom of a corresponding user and an increase in a number of times the user sends and/or receives messages for a current preset (or alternatively, desired) period of time. For example, with respect to a participant B of a chat session A, a chat joinability score of the user B may be set to a relatively high value as a number of messages sent from the user B increases with respect to a total number of messages sent for a preset (or alternatively, desired) period of time in the chat session A.

Also, the server 150 may also provide a chat joinability score for each user as chat concentration of each of participants in a corresponding chatroom. For example, when it is assumed that a user A, a user B, and a user C are joining a chatroom A, the server 150 may display chat concentration of each of the user A, the user B, and the user C in association with a corresponding user in the chatroom A. Also, context information (e.g., run, in meeting, bus, bicycle) of participants may be provided from a chatroom.

Also, the server 150 may provide a user interface that allows each of individual users to set whether to display context information, chat concentration, etc., with respect to each of friends (e.g., other users having a personal relationship at the messaging service) of a corresponding user through a messenger application.

Also, the server 150 may provide a function of assisting a chatroom creation based on context information to users through the messenger application. For example, the server 150 may recommend a participant of a chat session to the user through the messenger application based on contexts of users at a time of creating the chatroom session. For example, the server 150 may recommend a friend in the same context as that of the user or in a context preset or selected by the user to the user. As another example, the server 150 may also recommend a friend having relatively high chat concentration to the user. Here, the server 150 may create and provide a new chatroom of a friend selected by the user from among such recommended friends.

According to another example embodiment, the server 150 may create an anonymity-based instant open chatroom based on context information. For example, the server 150 may create an anonymity-based chatroom in which users in the same context in a specific area are participants and may recommend the corresponding users to join the created chatroom. Also, if the user sets an area and/or context, the server 150 may retrieve chatrooms suitable for the set area and/or context and may provide a list of retrieved chatrooms. Even in the anonymity-based chatroom, the user may set whether to display context information or chat concentration (e.g., chat joinability score) of the user.

The function may provide an opportunity of exchanging information between anonymous users in a specific context or easily gathering and having a chat between users associated with a specific event. For example, users gathered to experience a game of each booth may exchange information about a length of a line for each booth, information associated with congestion of vehicles on a specific road, or information about attractions of an amusement park or appreciation of persons attending the same performance or related information through an anonymity-based chatroom. That is, the server 150 may induce anonymous users in a specific context to join the anonymity-based chatroom and exchange information.

Figure 11:
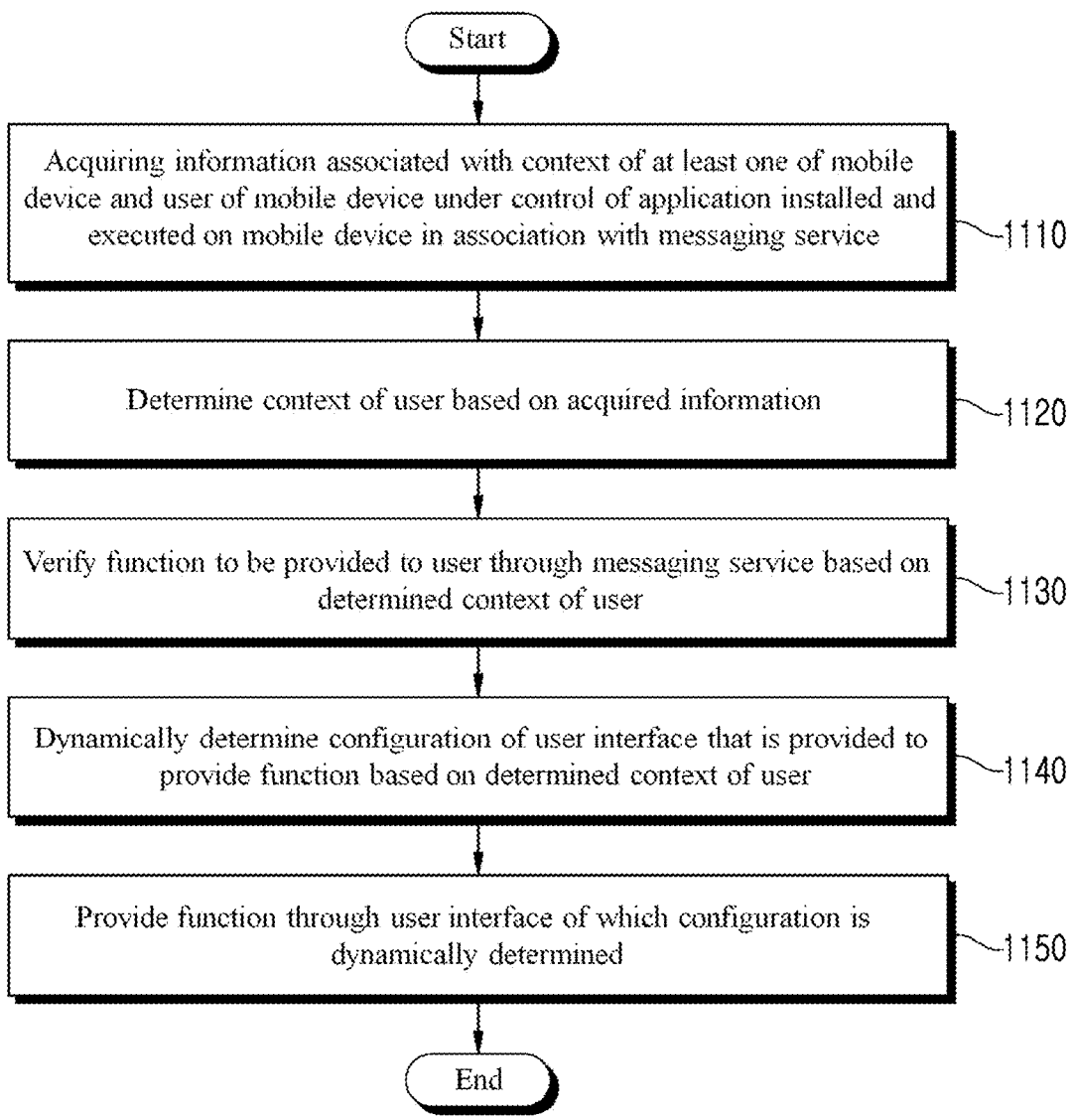
FIG. 11 is a flowchart illustrating an example of an interaction method according to at least one example embodiment.

FIG. 11 is a flowchart illustrating an example of an interaction method according to at least one example embodiment. The interaction method according to the example embodiment may be performed by the aforementioned computer apparatus 200. The computer apparatus 200 may correspond to the aforementioned mobile device or electronic device 110, and may receive a messaging service from the server 150 providing the messaging service over the network 170. For example, the processor 220 of the computer apparatus 200 may be configured to execute a control instruction according to a code of at least one program or a code of an OS included in the memory 210. Here, the processor 220 may control the computer apparatus 200 to perform operations 1110 to 1150 included in the interaction method of FIG. 11 in response to a control instruction provided from a code stored in the computer apparatus 200.

Referring to FIG. 11, in operation 1110, the computer apparatus 200 may acquire information associated with a context of at least one of a mobile device and a user of the mobile device under control of an application installed and executed on the mobile device in association with a messaging service. Information associated with a context of the user is described above with reference to the first process 310 to the sixth process 360 of FIG. 3.

In operation 1120, the computer apparatus 200 may determine a context of the user based on the acquired information. For example, in operation 1120, the computer apparatus 200 may determine, as the context of the user, a context that is determined by inputting the acquired information to a classification model configured or pre-trained to determine a single context among preset contexts (or a plurality of desired contexts) based on input information. The pre-trained classification model is described above through naive Bayes classification as a classification model using a probability and an SVM as a non-probabilistic classification model.

In operation 1130, the computer apparatus 200 may verify a function to be provided to the user through the messaging service based on the determined context of the user. A function of providing a notification window to the user in response to receiving a message is described above with reference to FIGS. 4 to 8. For example, the function may include a function of providing a notification about a received message to the user through the messaging service, and the user interface may include a configuration of not displaying a notification window, a configuration of displaying content of a message through the notification window, a configuration of providing the content of the message and a selection interface through the notification window, and a configuration of providing the content of a message, a selection interface, and a text input interface through the notification window. In this case, in operation 1130, the computer apparatus 200 may determine a single level among a plurality of levels based on a device access status of the user, a device manipulation status of the user, and/or a text input status of the user. Depending on example embodiments, the level may be determined by the server 150 that is connected to the computer apparatus 200 over the network 170 and provides the messaging service to the computer apparatus 200, based on information received from the computer apparatus 200.

In operation 1140, the computer apparatus 200 may dynamically determine a configuration of a user interface for providing the function, based on the determined context of the user. For example, a configuration of a user interface may be defined or preset with respect to each level, and the computer apparatus 200 may dynamically determine the configuration of the user interface for providing the function through a user interface that includes configurations provided based on levels less than the level determined in operation 1130, based on the context of the user.

In operation 1150, the computer apparatus 200 may provide the function through the user interface of which configuration is dynamically determined. Therefore, the user may be provided with a user interface that includes a different configuration based on the context of the user and may interact with the messaging service through a context-by-context user interface.

FIG. 12 is a flowchart illustrating another example of an interaction method according to at least one example embodiment. The interaction method according to the example embodiment may be performed by the aforementioned computer apparatus 200. The computer apparatus 200 according to the example embodiment may correspond to the server 150 that provides a messaging service. For example, the processor 220 of the computer apparatus 200 may be configured to execute a control instruction according to a code of at least one program or a code of an OS included in the memory 210. Here, the processor 220 may control the computer apparatus 200 to perform operations 1210 to 1250 included in the interaction method of FIG. 12 in response to a control instruction provided from a code stored in the computer apparatus 200.

Referring to FIG. 12, in operation 1210, the computer apparatus 200 may store and manage information about other members having a personal relationship established for each of a plurality of members using a messaging service. The computer apparatus 200 may be an entity that provides the messaging service, and accordingly, may manage information about a personal relationship between members at the messaging service.

In operation 1220, the computer apparatus 200 may continuously gather context information about each of the plurality of members. For example, information provided from each of mobile devices of members of the messaging service through the first process 310 to the sixth process 360 of FIG. 3 may be gathered at the computer apparatus 200. In this case, the computer apparatus 200 may determine context information and/or level (e.g., a level of freedom described with reference to Table 1) of members based on information gathered by performing the seventh process 370. Depending on some example embodiments, in each of the mobile devices of the members, all of the first process 310 to the seventh process 370 may be performed. In this case, the computer apparatus 200 may gather context information and/or level from each of the mobile devices.

In operation 1230, the computer apparatus 200 may store and update the gathered context information in a database in association with a corresponding member. The computer apparatus 200 may update the database by periodically gathering context information from the mobile devices.

In operation 1240, in response to providing information about a second member having a personal relationship established with a first member among the plurality of members to the first member, the computer apparatus 200 may extract context information about the second member from the database. In response to providing a list of other members having a personal relationship established with the first member, the computer apparatus 200 may extract context information about each of the other members from the database.

In operation 1250, the computer apparatus 200 may provide the extracted context information to the first member with information about the second member. As described above, in response to providing a list of other members having a personal relationship established with the first member, the computer apparatus 200 may extract context information about each of the other members from the database.

Depending on some example embodiments, the computer apparatus 200 may calculate and provide a chat joinability score with context information or instead of the context information. For example, the computer apparatus 200 may calculate a chat joinability score of the second member based on the context information extracted from the database, and may provide the calculated chat joinability score to the first member with information about the second member. As described above, the chat joinability score may be calculated as a relatively high value according to an increase in a level for a context of the second member and an increase in a number of messages sent from and received by the second member through a chat session.

According to another example embodiment, the computer apparatus 200 may provide a chat joinability score for a chatroom. For example, in response to providing information about a chat session joined by the first member, the computer apparatus 200 may extract context information of each of members joining the chat session from the database, and may calculate a chat joinability score for the chat session based on the context information of each of the members joining the chat session. In this case, the computer apparatus 200 may provide the calculated chat joinability score to the first member with information about the chat session. The chat joinability score may be calculated as a relatively high value according to an increase in a level according to context information of each of the members joining the chat session and/or an increase in a number of messages sent and/or received through the chat session. Also, the computer apparatus 200 may sort a list of chat sessions joined by the first member based on chat joinability scores for the chat sessions joined by the first member and may provide the sorted list to the first member.

According to another example embodiment, the computer apparatus 200 may provide a user interface that allows the first member to set whether to provide context information to the other members having a personal relationship established with the first member for each of the other members, through an application installed and executed on a mobile device of the first member in association with the messaging service. That is, each of members of the messaging service may set whether to display context information of a corresponding member to friends for each friend. Depending on some example embodiments, a user interface for setting whether to display a chat joinability score as well as context information for each friend may be provided.

According to another example embodiment, the computer apparatus 200 may determine a third member having the same context information as that of the first member or having context information desired or preset by the first member among the other members, may recommend the third member to the first member, and may, in response to a selection on the recommended third member, create a chat session in which the first member and the third member are participants. That is, the computer apparatus 200 may provide each of the members with a function of recommending a friend having the same context or context set by members or creating a chatroom with a recommended friend.

According to another example embodiment, the computer apparatus 200 may select members having the same context information among the plurality of members, and may create an anonymous chat session between the selected members. Also, the computer apparatus 200 may retrieve an anonymous chat session corresponding to context information set by the first member, and may provide information about the retrieved anonymous chat session to the first member. Here, a geographical location may be further used to select or retrieve members. For example, an anonymous chatroom between users having the same context in the same area may be created, retrieved, and provided.

According to some example embodiments, it is possible to provide a different user interface based on a context of a user in terms of providing the same function, for example, providing a notification, by inferring a current context of the user based on current information and recent records acquirable from a mobile device, by determining a level of freedom of the user based on a device access status, a device manipulation status, and a text input status according to the inferred context of the user, and by determining an interaction method with a messaging service based on the determined level of freedom.

According to some example embodiments, it is possible to provide status information of other users having a personal relationship established with a specific user to the specific user by gathering and managing information about contexts of users at a messaging service.

According to some example embodiments, it is possible to provide and/or display information about a chat joinability score for each of chat sessions established at a messaging service by gathering and managing information about contexts of users at the messaging service.

According to some example embodiments, it is possible to provide and/or display information about the chat concentration of participants in a chat session at a messaging service by gathering and managing information about contexts of users at the messaging service.

According to some example embodiments, it is possible to recommend a participant of a chat session based on contexts of users at a time of creating the chat session by gathering and managing information about contexts of users at the messaging service.

According to some example embodiments, it is possible to provide a function that allows users to retrieve, create, and participate in an anonymous cat session based on contexts of the users by gathering and managing information about contexts of the users at a messaging service.

According to some example embodiments, it may possible to reduce consumption of system (or apparatus) resources. For example, by providing a user interface having different configurations based on context information of a user, it may be possible to turn off a display of the system (or apparatus) and/or to reduce the usage of the computing resources for a certain context of a user. Further, a battery life of the system (or apparatus) may be extended due to the turning-off of the display and/or the reduced usage of the system resources.

The systems or apparatuses described above may be implemented using hardware components, software components, and/or a combination thereof. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors, distributed processors, a cloud computing configuration, etc. Moreover, each processor of the at least one processor may be a multi-core processor, but the example embodiments are not limited thereto.

The software may include a computer program, a piece of code, an instruction, or some combination thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable storage mediums.

The methods according to the above-described example embodiments may be recorded in non-transitory computer-readable media including program instructions to implement various operations of the above-described example embodiments. The media may also include, alone or in combination with the program instructions, data files, data structures, and the like. The media may continuously store a program executable by a computer or may temporarily store or the program for execution or download. Also, the media may be various types of recording devices or storage devices in which a single piece or a plurality of pieces of hardware may be distributed over a network without being limited to a medium directly connected to a computer system. Examples of the media may include magnetic media such as hard disks, floppy disks, and magnetic tapes; optical media such as CD-ROM discs and DVDs; magneto-optical media such as floptical disks; and hardware devices that are specially configured to store and perform program instructions, such as read-only memory (ROM), random access memory (RAM), flash memory, and the like. Examples of other media may include recording media and storage media managed at Appstore that distributes applications or sites and servers that supply and distribute various types of software. Examples of program instructions include both machine code, such as produced by a compiler, and files containing higher level code that may be executed by the computer using an interpreter.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

What is claimed is:

1. An interaction method of a mobile device, the interaction method comprising:
   acquiring information associated with a context of at least one of a mobile device and a user of the mobile device under control of an application installed and executed on the mobile device in association with a messaging service;
   determining a context of the user based on the acquired information;

determining a level of freedom of the user based on the context of the user, the level of freedom of the user being determined based on an access availability of the mobile device by the user, a manipulation availability of the mobile device by the user, and a text input availability to the mobile device by the user;

verifying a function to be provided to the user through the messaging service based on the determined level of freedom of the user;

dynamically determining a configuration of a user interface based on the determined level of freedom of the user; and providing the function through the user interface of which the configuration is dynamically determined.

2. The interaction method of claim 1, wherein the determining the context of the user comprises:

determining a specific context by inputting the acquired information to a classification model pre-trained to determine one context among preset contexts based on input information; and determining the specific context as the context of the user.

3. The interaction method of claim 1, wherein the determining the context of the user comprises determining one level of freedom among a plurality of levels of freedom based on a device access status of the user, a device manipulation status of the user, and a text input status of the user.

4. The interaction method of claim 3, further comprising:

setting the configuration of the user interface with respect to each of the plurality of levels of freedom, wherein the providing comprises providing the function through the user interface configured based on the determined one level of freedom or one of the plurality of levels of freedom lower than the determined one level of freedom, among the plurality of levels of freedom.

5. A non-transitory computer-readable record medium storing instructions that, when executed by a processor, cause a mobile device to perform the interaction method of claim 1.

6. A computer apparatus comprising:

at least one processor configured to execute computer-readable instructions, wherein the at least one processor is configured to case the computer apparatus to, acquire information associated with a context of at least one of a mobile device and a user of the mobile device under control of an application installed and executed on the mobile device in association with a messaging service, determine a context of the user based on the acquired information, determine a level of freedom of the user based on the context of the user, the level of freedom of the user being determined based on an access availability of the mobile device by the user, a manipulation availability of the mobile device by the user, and a text input availability to the mobile device by the user, verify a function to be provided to the user through the messaging service based on the determined level of freedom of the user, dynamically determine a configuration of a user interface based on the determined level of freedom of the user, and provide the function through the user interface of which the configuration is dynamically determined.

7. The computer apparatus of claim 6, wherein the at least one processor is further configured to determine the context of the user by:

determining a specific context by inputting the acquired information to a classification model pre-trained to determine one context among a plurality of contexts based on input information; and determining the specific context as the context of the user.

8. The computer apparatus of claim 6, wherein the at least one processor is further configured to, calculate a chat joinability score of a first member based on extracted context information, and provide the calculated chat joinability score to a second member with information about the first member.

* * * * *